United States Patent
Yamano et al.

(10) Patent No.: US 8,711,461 B2
(45) Date of Patent: Apr. 29, 2014

(54) APERTURE STOP

(75) Inventors: Shiro Yamano, Sagamihara (JP); Takayuki Sato, Nankoku (JP)

(73) Assignee: Yamano Optical Co., Ltd., Kanagawa (JP)

( * ) Notice: Subject to any disclaimer, the term of this patent is extended or adjusted under 35 U.S.C. 154(b) by 423 days.

(21) Appl. No.: 12/809,937

(22) PCT Filed: Oct. 5, 2009

(86) PCT No.: PCT/JP2009/067352
§ 371 (c)(1),
(2), (4) Date: May 4, 2011

(87) PCT Pub. No.: WO2011/007461
PCT Pub. Date: Jan. 20, 2011

(65) Prior Publication Data
US 2011/0205651 A1    Aug. 25, 2011

(30) Foreign Application Priority Data
Jul. 16, 2009 (WO) ................. PCT/JP2009/062885

(51) Int. Cl.
*G02B 26/02* (2006.01)
*F21V 9/16* (2006.01)

(52) U.S. Cl.
USPC ......... 359/233; 359/227; 250/458.1; 600/181

(58) Field of Classification Search
USPC ........ 359/227, 230, 233; 250/458.1; 600/109, 600/160, 178
See application file for complete search history.

(56) References Cited

U.S. PATENT DOCUMENTS

| | | |
|---|---|---|
| 2005/0008358 A1 | 1/2005 | Kanome et al. |
| 2007/0139764 A1 | 6/2007 | Vodyanoy et al. |
| 2008/0251694 A1 | 10/2008 | Tanimoto et al. |

FOREIGN PATENT DOCUMENTS

| | | |
|---|---|---|
| JP | 9-130678 | 5/1997 |
| JP | 10151104 A | 6/1998 |
| JP | 11-234553 | 8/1999 |
| JP | 2001078205 A | 3/2001 |
| JP | 2002189238 A | 7/2002 |
| JP | 2004205557 A | 7/2004 |
| JP | 2008188196 A | 8/2008 |
| JP | 2008259591 A | 10/2008 |

OTHER PUBLICATIONS

Supplementary European Search Report; Application No. EP 09 84 7357 dated Oct. 31, 2012.

(Continued)

*Primary Examiner* — James Phan
(74) *Attorney, Agent, or Firm* — Antonelli, Terry, Stout & Kraus, LLP.

(57) ABSTRACT

An aperture stop 10A includes a filter area 1 formed on a flat-plate substrate 23, and an aperture area 2 formed inside the filter area 1. The filter area 1 transmits infrared light and reduces or blocks the transmission of visible light. The aperture area 2 transmits light in the wavelength range corresponding to fluorescent light from an observed area of a subject and light in the wavelength range corresponding to illumination light to the subject. The aperture stop 10A does not reduce the light in the wavelength range corresponding to fluorescent light from the observed area of the subject, but variably reduces visible light since the area of the aperture area 2 is variable. Therefore, it becomes possible to simultaneously and clearly observe, with a simple method, a subject image formed by illumination light in the visible light band and an observed image formed by weak fluorescent light from the observed area of the subject in the infrared light band.

6 Claims, 7 Drawing Sheets

(56) References Cited

OTHER PUBLICATIONS

Japanese Office Action; Application No. 2011-522679 dated Oct. 31, 2012.

International Preliminary Report and Written Opinion mailed Jan. 26, 2012 and Translation of International Preliminary Report and Written Opinion mailed Feb. 16, 2012. International Application No. PCT/JP2009/067352; Interanational Filing Date: Oct. 5, 2009.

Japanese Office Action; Application No. 2011-522679 dated Jan. 23, 2013.

Fig. 1

(A−A sectional view)

(A−A sectional view)

(A−A sectional view)

(A−A sectional view)

APERTURE STOP

TECHNICAL FIELD

The present invention relates to an aperture stop used for simultaneously and clearly capturing an observed image formed by weak fluorescent light and a subject image formed by strong illumination light when the light amount of fluorescent light from an observed area of a subject is very small as compared with that of the illumination light illuminating the subject.

BACKGROUND ART

Photodynamic diagnosis (PDD) and photodynamic therapy (PDT) have been used in the medical field. PDD is a diagnosis utilizing characteristics such that a light-sensitive substance that generates fluorescent light by the irradiation of excitation light is specifically accumulated in tumor tissues wherein the light-sensitive substance is administered in a living body in advance and the tumor tissues are observed based on the fluorescent light emitted from the substance. PDT is a therapy that destroys tumor tissues utilizing singlet oxygen generated by the excitation of a light-sensitive substance.

With PDD or PDT, it is required to be able to photograph and observe fluorescent light emitted from the light-sensitive substance in tumor tissues with a high degree of accuracy under strong illumination light such as shadowless light in an operation room. However, the fluorescent light emitted from the light-sensitive substance is extremely weak as compared with the illumination light, thereby causing such a problem that a fluorescent light image is lost in the subject image formed by the illumination light.

On the other hand, in recent years, there has been a widespread attention to a diagnosis method including administering indocyanine green (ICG) in a living body as a optical contrast agent, exciting ICG by the irradiation of excitation light or the like, and capturing the image of near-infrared fluorescent light emitted by ICG along with the subject image to observe these images. Hemoglobin has an absorption in a short wavelength of less than 600 nm, and water has an absorption in a long wavelength of more than 900 nm. On the other hand, the excitation wavelength of ICG and the wavelength of fluorescent light emitted by ICG are each in a wavelength band of 600 to 900 nm in which hemoglobin or water has no absorption. Therefore, by using ICG, it becomes possible to observe the inside of a living body. With this method, however, there is a problem that the fluorescent light image is lost in the subject image.

In order to solve such a problem, it has been proposed that when a subject image containing fluorescent light in an infrared region is separated into RGB components and the RGB components are superimposed on one another to form a color image, the separation is performed so that the R component is enhanced, thereby emphasizing the observed area of weak fluorescent light (Patent Document 1). With this method, however, since not only fluorescent light in the infrared region but also light of the R component forming the subject image are emphasized simultaneously, it becomes difficult to accurately observe the area emitting fluorescent light in the subject image. Moreover, there is another problem such that it is required to provide a filter for separating the subject image into RGB components and a filter driving mechanism, thereby complicating the device configuration.

Moreover, it has been proposed that an observed image formed by weak fluorescent light emitted by an observed area in a subject and a subject image formed by the reflected light of the subject are simultaneously observed when the subject is illuminated by means of an illuminator containing excitation light and illumination light, wherein the intensity of an excitation light component and the intensity of an illumination light component are adjusted, so that the brightness values or contrast values of the observed image and the subject image are controlled (Patent Document 2). However, in the case where such an illuminator is used, not for endoscopic observation, but for observing tissues exposed to the strong illumination light in an operation room or the like, it is required to substantially reduce the illumination light component, thereby causing a problem such that the operation room must be darkened.

Furthermore, it has been proposed an imaging device for simultaneously photographing an observed image formed by fluorescent light in the infrared light band and a subject image in the visible light band, wherein an optical filter for cutting excitation light and transmitting therethrough infrared light and visible light is used, and wherein light transmittances are made different from each other between infrared light and visible light, so that a suitable balance between the infrared light image and the visible light image is achieved (Patent Document 3). However, fluorescent light in the infrared light band forming the observed image is extremely weak as compared with illumination light in the visible light band forming the subject image. Therefore, it is difficult to obtain an optical filter such that the balance between the transmittance in the infrared light band and that in the visible light band is well adjusted. Furthermore, since the focal plane of fluorescent light in the infrared light band forming an observed image is different from the focal plane of light in the visible light band forming a subject image, it is not possible to simultaneously and clearly capture the observed image and the subject image.

As opposed to this, it has been proposed to use, in a fluorescent light endoscopic device, a filter stop that is concentrically divided into three sections. The innermost section thereof is a circular visible light transmitting section, the outer side of the innermost section is a visible light non-transmitting section, and the outermost section is a light shielding section. By using such a filter stop, a fluorescent light image is lightened up with respect to a visible light image, thereby making it possible to observe the visible light image at a deeper depth of focus (Patent Document 4). However, when this filter stop is used for observing tissues exposed to illumination light in an operation room or the like, the intensity of illumination light greatly varies depending on specific observation conditions. Thus, it is not possible to suitably adjust the brightness of the fluorescent light image with respect to the visible light image.

PRIOR ART DOCUMENTS

Patent Documents

[Patent Document 1] Japanese Patent Application Laid-Open No. 2001-78205
[Patent Document 2] Japanese Patent Application Laid-Open No. 2008-259591
[Patent Document 3] Japanese Patent Application Laid-Open No. 2008-188196
[Patent Document 4] Japanese Patent Application Laid-Open No. Hei 10-151104

SUMMARY OF THE INVENTION

Problems to be Solved by the Invention

As described above, it has been a problem in the art to clearly observe a subject image formed by illumination light and an observed image formed by weak fluorescent light from an observed area of a subject. Therefore, an object of the present invention is to obtain, with a simple method, both of a clear subject image formed by illumination light and a clear observed image formed by fluorescent light from an observed area of a subject when the fluorescent light from the observed area of the subject is weak as compared with the illumination light forming the subject image and the intensity of the illumination light varies depending on the observation conditions.

Means for Solving the Problems

The present inventors have found that the above-described problem can be solved by using an aperture stop that functions as an aperture stop whose degree of opening is variable for light in the wavelength range corresponding to illumination light, while transmitting without reducing, light in the wavelength range corresponding to fluorescent light from an observed area of a subject.

That is, the present invention provides an aperture stop including a plurality of stop blade members each having a filter portion formed on a part of or an entire surface of the stop blade member, thereby defining a filter area formed by the filter portions of the plurality of stop blade members, and an aperture area positioned inside the filter area, wherein the filter area transmits light in a wavelength range corresponding to fluorescent light from an observed area of a subject, and reduces or blocks transmission of light in a wavelength range corresponding to illumination light to the subject; the aperture area transmits the light in the wavelength range corresponding to the fluorescent light from the observed area of the subject, and the light in the wavelength range corresponding to the illumination light to the subject; and the light in the wavelength range corresponding to the fluorescent light from the observed area of the subject is not reduced, and an area of the aperture area is variable.

Moreover, the present invention provides an imaging device including the aperture stop described above, for capturing both an observed image formed by the fluorescent light from the observed area of the subject and a subject image formed by the illumination light.

Furthermore, the present invention provides an observation device for simultaneously observing both an observed image formed by fluorescent light from an observed area of a subject and a subject image formed by illumination light, wherein the observation device includes the aperture stop described above.

Effects of the Invention

According to the aperture stop of the present invention, the aperture area is formed inside the filter area that transmits light in the wavelength range corresponding to fluorescent light from an observed area of a subject, and reduces or blocks light in the wavelength range corresponding to illumination light to the subject. Thus, only the light in the wavelength range of illumination light forming the subject image is reduced without reducing the fluorescent light from the observed area of the subject. Therefore, even when the light amount of light in the wavelength range of illumination light forming the subject image is predominantly greater than that of weak fluorescent light from the observed area of the subject, it is possible to clearly observe the observed image formed by weak fluorescent light while preventing the observed image formed by weak fluorescent light from being lost in the subject image formed by the illumination light.

Moreover, according to the aperture stop of the present invention, light forming a subject image formed by illumination light is reduced by the aperture area. Therefore, according to an imaging device including the aperture stop of the present invention, the focal depth is increased for the light in the wavelength range corresponding to the illumination light. Thus, even though the focal planes of the light forming the subject image and the fluorescent light forming the observed image are misaligned with each other due to their different wavelengths when the observed image formed by fluorescent light is focused in the imaging device including the aperture stop of the present invention, it is possible to clearly obtain the subject image, too.

Furthermore, according to the aperture stop of the present invention, the area of the aperture area is variable. Thus, it is possible to more suitably adjust the balance between the light amount of light forming a subject image and the light amount of fluorescent light forming an observed image and adjust the focal depths thereof.

In addition, according to the aperture stop of the present invention, the effects described above can be obtained with a simple configuration. Thus, according to the imaging device of the present invention including the aperture stop of the present invention, it is possible to clearly and inexpensively obtain both of a subject image formed by illumination light and an observed image formed by fluorescent light from an observed area of the subject.

EMBODIMENT FOR CARRYING OUT THE INVENTION

Hereinafter, the present invention will be described in detail with reference to the drawings. Note that in the drawings, the same reference numerals refer to the same or like elements.

Figure 1:
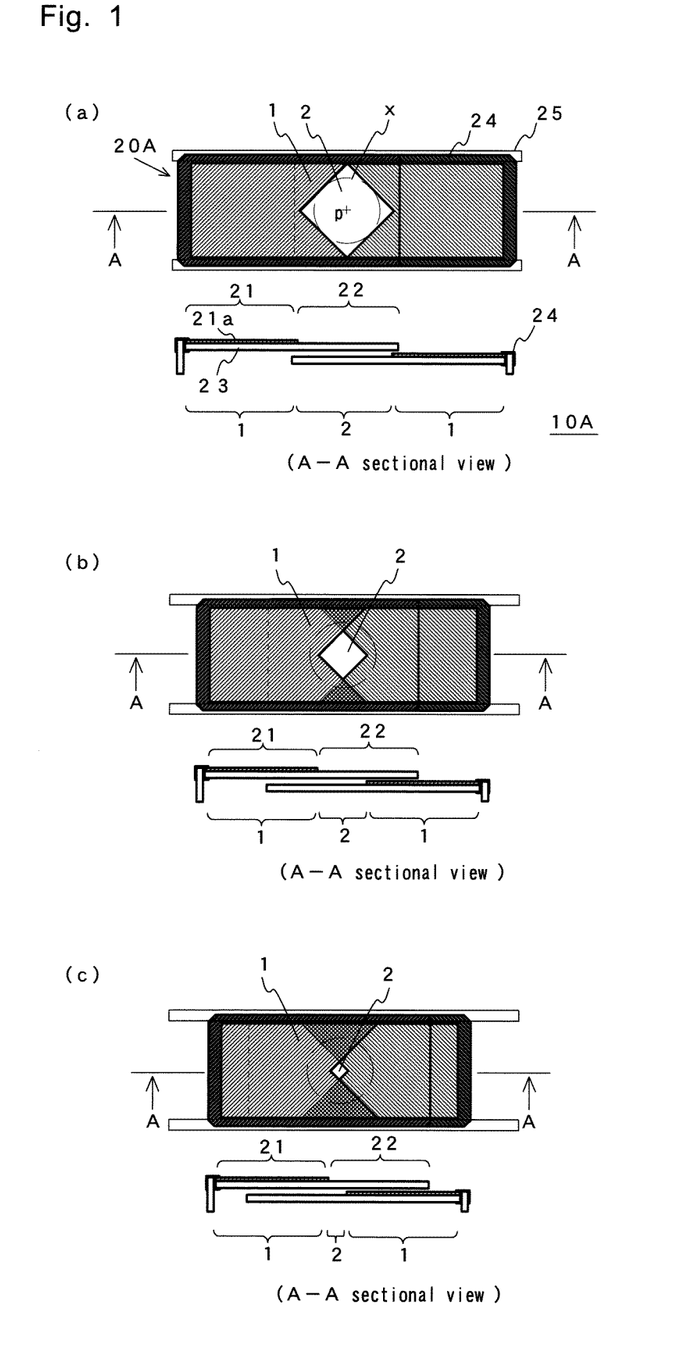
FIG. 1 shows plan views and cross-sectional views illustrating a function of a two-blade type aperture stop 10A according to an embodiment of the present invention.
Figure 2:
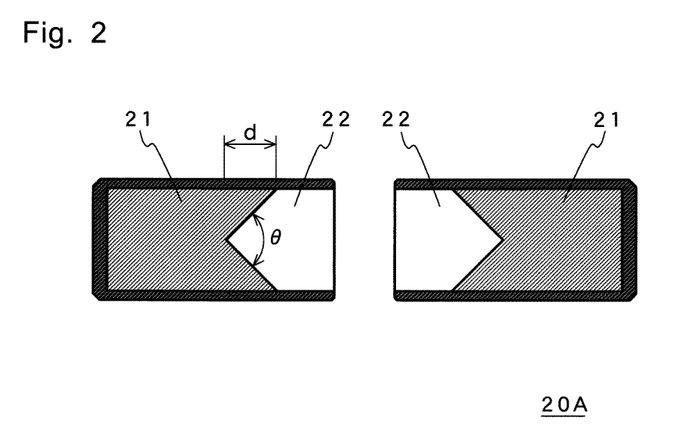
FIG. 2 is a plan view of stop blade members 20A of the two-blade type aperture stop 10A according to the embodiment of the present invention.

FIG. 1 is a diagram illustrating a two-blade type aperture stop 10A, which is an aperture stop according to an embodiment of the present invention. FIG. 2 is a plan view showing a pair of stop blade members 20A of the two-blade type aperture stop 10A.

The stop blade member 20A includes a filter portion 21 on which a filter layer 21a is formed and a non-filter portion 22 that is an area on which the filter layer 21a is not formed. The filter portion 21 and the non-filter portion 22 are provided respectively at the left half and right half of the surface of a rectangular flat-plate substrate 23. The stop blade member 20A is fitted into an outer frame 24. Herein, the filter layer 21a has a V-shaped reentrant portion on the side of the non-filter portion 22. The filter layer 21a transmits, without substantially attenuating, light in the wavelength range of fluorescent light from an observed area of a subject, and has light transmitting characteristics such that light in the wavelength range of illumination light to the subject is reduced or blocked.

The two-blade type aperture stop 10A shown in FIG. 1 is obtained by combining the pair of stop blade members 20A so that the non-filter portions 22 thereof are overlapped with each other, and by movably attaching the stop blade members 20A on rails 25. According to this two-blade type aperture stop 10A, the area where the non-filter portions 22 of the pair of stop blade members 20A are overlapped with each other is an aperture area 2 of the two-blade type aperture stop 10A. The aperture area 2 transmits light in the wavelength range of fluorescent light from an observed area of a subject and light in the wavelength range of illumination light to the subject. The pair of filter portions 21 surrounding the aperture area 2 is a filter area 1 of the two-blade type aperture stop 10A. The filter area 1 transmits light in the wavelength range of fluorescent light from the observed area of the subject, and reduces or blocks light in the wavelength range of illumination light to the subject.

Therefore, according to the two-blade type aperture stop 10A, the area of the aperture area 2 is variable. The area of the aperture area 2 can be continuously varied, for example, to a state such that the aperture area 2 is at its maximum as shown in FIG. 1(a), a state such that the aperture area 2 is narrowed as shown in FIG. 1(b), and a state such that the aperture area 2 is further narrowed as shown in FIG. 1(c). Thus, it is possible to suitably adjust the balance between the light amount of light forming a subject image and the light amount of fluorescent light forming an observed image as well as the focal depths thereof.

In FIG. 1, a broken-line circle X around the aperture area 2 shows a maximum area of an optical path at an attachment position in the case where the two-blade type aperture stop 10A is attached to an optical system such as an imaging device. As shown in this drawing, the filter area 1 in the two-blade type aperture stop 10A is always greater than the maximum area shown by the broken-line circle X regardless of the size of the aperture of the aperture area 2. Therefore, the effective diameter of fluorescent light from an observed area of a subject is not narrowed. Thus, it is always possible to utilize fluorescent light from an observed area of a subject as effectively as possible.

Herein, the wavelength range of fluorescent light and the wavelength range of illumination light can be suitably determined depending on a subject to be observed, the kind of a light-sensitive substance, an optical contrast agent, or the like, the observation purpose, etc. For example, suppose the case where ICG is accumulated in a living body to use the accumulated area as an observed area, and ICG is irradiated with excitation light so that fluorescent light is emitted, thereby observing the fluorescent light. In this case, it is preferred to use 750 to 810 nm as the excitation wavelength range, and to set white light containing the light in this excitation wavelength range as the wavelength range of illumination light. This is because the peak excitation wavelength of ICG is 805 nm, and the peak fluorescent light wavelength of ICG is 845 nm. Therefore, it is preferred in the filter area 1 that light of 810 to 1000 nm containing the wavelength range of fluorescent light is transmitted but light of 400 to 810 nm whose wavelength is shorter than the wavelength range of fluorescent light is reduced or blocked.

Figure 3:
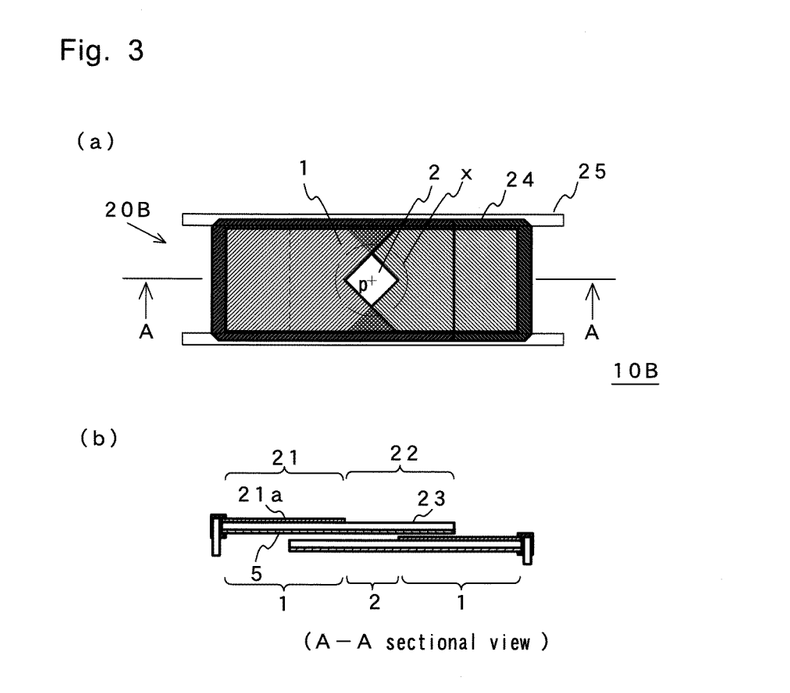
FIG. 3 shows a plan view and a cross-sectional view of a two-blade type aperture stop 10B according to an embodiment of the present invention.

Note that if the light transmitting characteristics of the two-blade type aperture stop 10A are set as described above, light in the wavelength range of excitation light can transmit through the aperture area 2. Accordingly, when the two-blade type aperture stop 10A is used, it is preferred to also use an excitation light cut filter for blocking light of 750 to 810 nm. Alternatively, as in a stop blade member 20B of a two-blade type aperture stop 10B shown in FIG. 3, the filter layer 21a described above may be formed on one surface of the flat-plate substrate 23 and an excitation light cut filter layer 5 for blocking light of 750 to 810 nm may be formed on the entire surface of the other surface of the flat-plate substrate 23.

On the other hand, when hematoporphyrin derivative (HpD) is used as a light-sensitive substance in PDD method, tumor cells in which HpD is accumulated emit fluorescent light having the peak wavelengths of 630 nm and 690 nm. Therefore, the wavelength range of fluorescent light is set to 610 to 720 nm. Moreover, since the excitation wavelength of HpD has the peak wavelength of 405 nm, it is preferred to use 385 to 425 nm as the excitation wavelength range, and to use white light containing the light in this excitation wavelength range as the wavelength range of illumination light. Therefore, the filter area 1 preferably transmits light of 610 to 720 nm, which is the wavelength range of fluorescent light, but blocks or reduces visible light whose wavelength is shorter than the wavelength range of fluorescent light and infrared light whose wavelength is longer than the wavelength range of fluorescent light. More preferably, the filter area 1 blocks light having wavelengths shorter and longer than the wavelength range of fluorescent light.

Note that the filter portion 21 in the two-blade type aperture stop 10A is formed, for example, by the vapor deposition of a thin film on the flat-plate substrate 23. The flat-plate substrate 23 is made of a transparent glass plate, a plastic resin plate, or the like.

Moreover, when combining the pair of stop blade members 20A of the two-blade type aperture stop 10A so that the non-filter portions 22 thereof are overlapped with each other, it is desired that the pair of stop blade members 20A be disposed as close as possible to each other without contacting the opposing surfaces thereof with each other.

As a driving mechanism for the stop blade members 20A, the pair of stop blade members 20A are preferably connected with each other by means of a known connector so that the pair of stop blade members 20A can move symmetrically with respect to the center p of the aperture area 2. As a driving source for the stop blade members 20A, manual operation may be employed, or a stepping motor, or the like, may be used.

The aperture stop of the present invention can be used in various other embodiments. For example, in the stop blade member 20A shown in FIG. 2, the angle θ of the opening of the V-shaped portion of the filter portion 21 and the depth d of the V-shaped portion may be any values as long as the aperture area 2 can be formed by overlapping the pair of non-filter portions 22 with each other.

Figure 4:
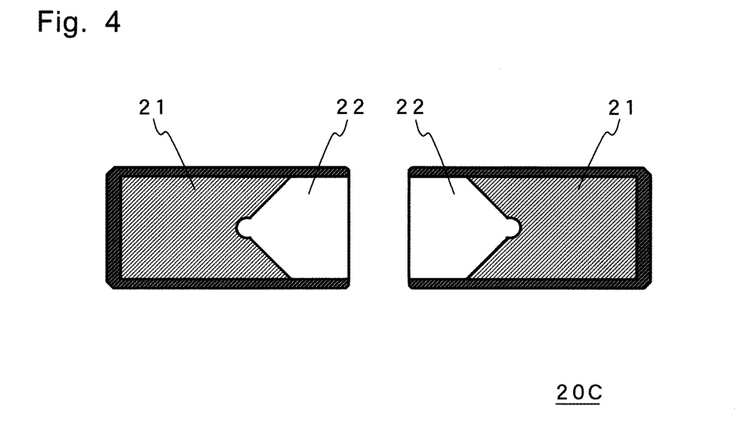
FIG. 4 shows a plan view of a stop blade member 20C of a two-blade type aperture stop according to an embodiment of the present invention.
Figure 5:
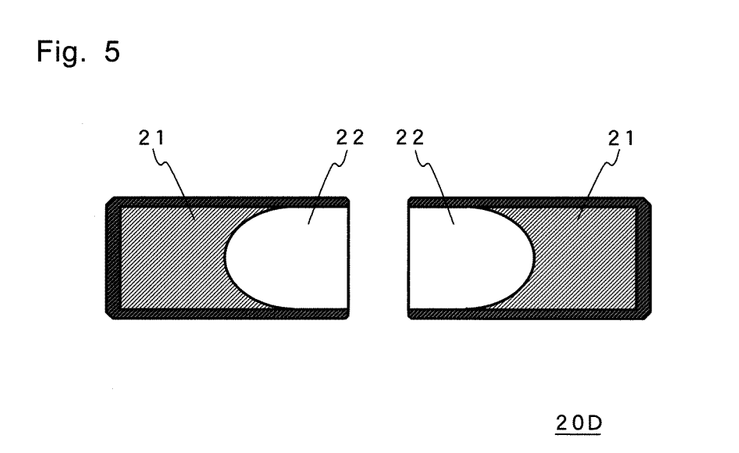
FIG. 5 shows a plan view of a stop blade member 20D of a two-blade type aperture stop according to an embodiment of the present invention.

Although in the stop blade member 20A shown in FIG. 2, the filter portion 21 has a V-shaped reentrant portion on the side of the non-filter portion 22, there are no restrictions in the reentrant shape itself as long as the aperture area 2 can be formed by overlapping the pair of non-filter portions 22 with each other. As in a stop blade member 20C shown in FIG. 4, the tip of the V-shaped reentrant portion may further have a reentrant semicircular shape in part, so that the aperture area 2 forms a circle when the area of the aperture area 2 is the smallest. Alternatively, as in a stop blade member 20D shown in FIG. 5, the filter portion 21 may have an reentrant semielliptical portion on the side of the non-filter portion 22.

Figure 6:
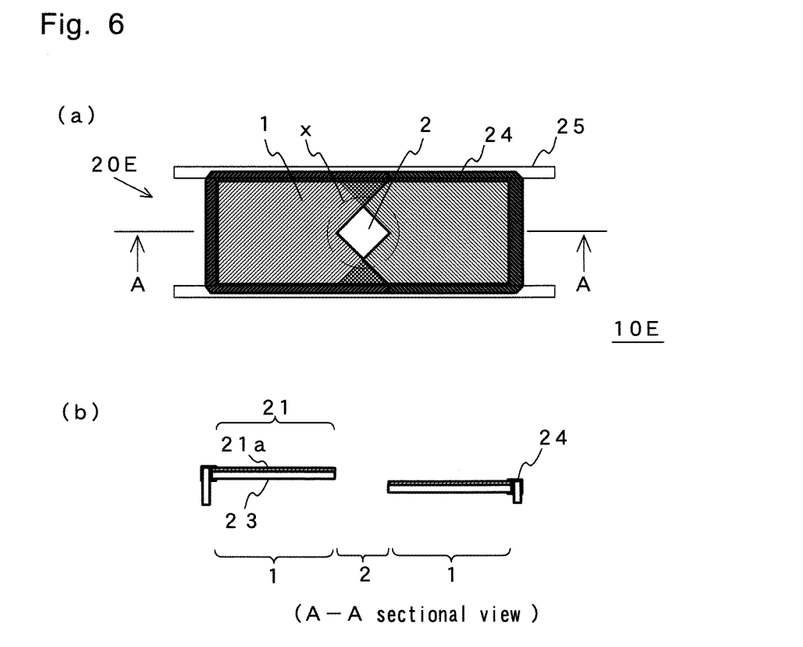
FIG. 6 shows a plan view and a cross-sectional view of a two-blade type aperture stop 10E according to an embodiment of the present invention.
Figure 7:
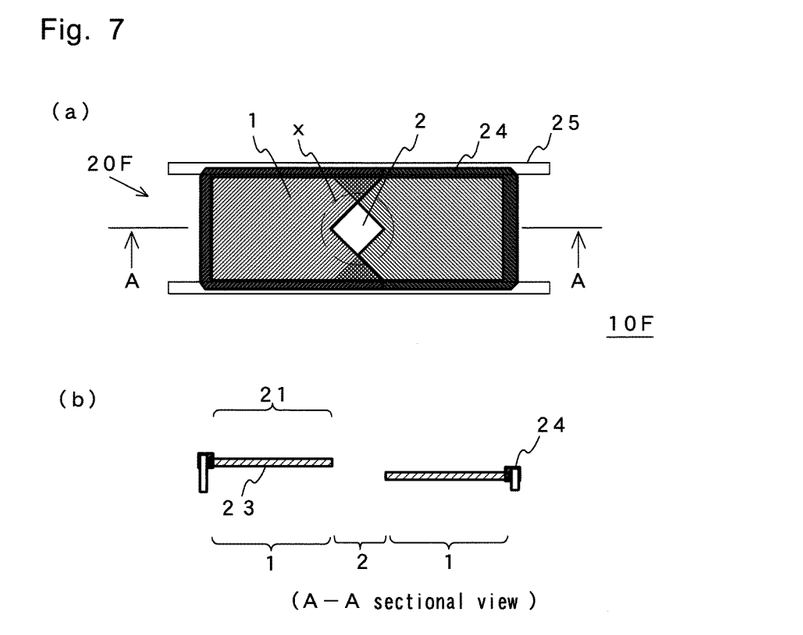
FIG. 7 shows a plan view and a cross-sectional view of a two-blade type aperture stop 10F according to an embodiment of the present invention.

As in a two-blade type aperture stop 10E shown in FIG. 6, the planar shape itself of the flat-plate substrate 23 that forms a stop blade member 20E may have a V-shaped reentrant shape in the same manner as that of the filter portion 21, and the entire flat-plate substrate 23 may be the filter portion 21. Alternatively, as in a stop blade member 20F of a two-blade type aperture stop 10F shown in FIG. 7, the flat-plate substrate 23 may be formed of a material in which a coloring material is dispersed evenly so as to have the same light transmitting characteristics as those of the filter layer 21a and cut out so as to have a reentrant shape to form the aperture area 2. Note, however, that it is preferred that a part of the flat-plate substrate 23 is provided as the filter portion 21 and the non-filter portion 22 of the flat-plate substrate 23 is provided adjacent to the side of the filter portion 21 as shown in FIG. 1, so that the total thickness of the stop blade member 20A in the optical axis direction in the filter area 1 and the total thickness of the stop blade member 20A in the optical axis direction in the aperture area 2 are set to be the same in the maximum area of the optical path represented by the broken line. Thus, no phase difference is caused between fluorescent light transmitting through the filter area 1 and fluorescent light transmitting through the aperture area 2. Thus, it is possible to clearly form an observed image.

The aperture stop of the present invention can be used in various other embodiments. For example, three or more stop blade members each having a filter portion and a non-filter portion may be combined to form a filter area and an aperture area positioned inside the filter area. In this case, it is also preferred that the total thickness of the stop blade member in the optical axis direction in the filter area and the total thickness of the stop blade member in the optical axis direction in the aperture area are set to be the same in the maximum area of the optical path in the aperture stop.

The aperture stop of the present invention can be used for wide variety of imaging devices for simultaneously capturing a subject image formed by illumination light and an observed image formed by fluorescent light from an observed area of a subject. As a result, even when fluorescent light forming the observed image is weak with respect to light forming the subject image, it is possible to clearly obtain both of the subject image and the observed image.

Figure 8:
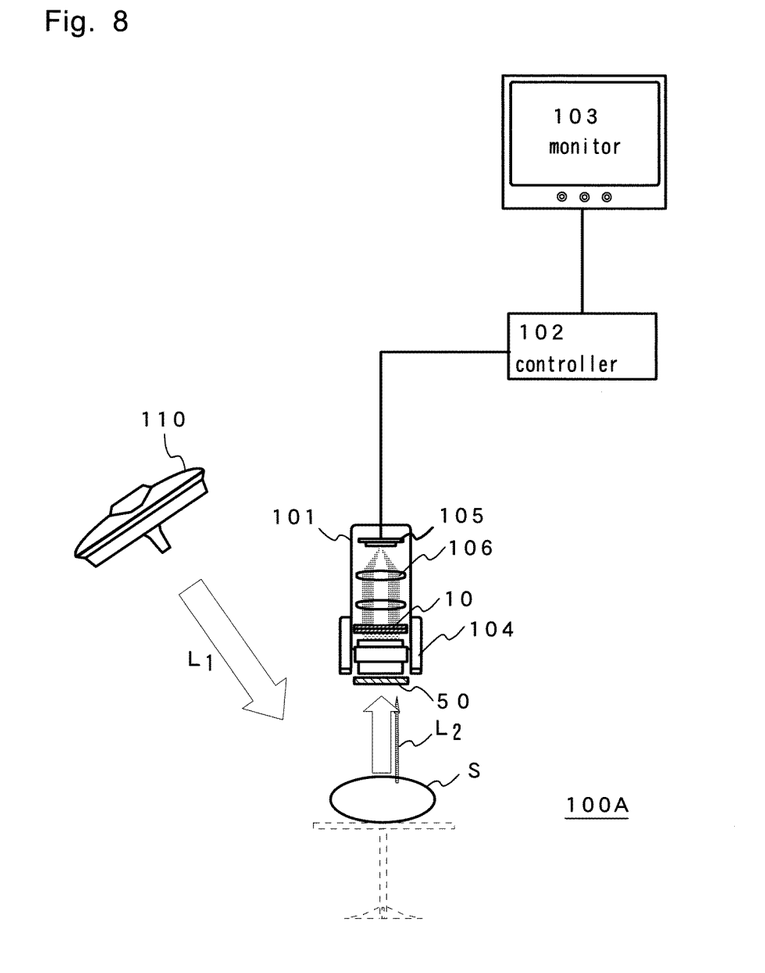
FIG. 8 is a schematic view showing a configuration of an imaging device 100A according to an embodiment of the present invention.

FIG. 8 is a schematic view showing the configuration of an exemplary imaging device 100A including an aperture stop 10 of the present invention in a known hand-held type near-infrared fluorescent light image imaging device using ICG. The imaging device 100A simultaneously captures both of a subject image formed by visible light (with a living body being a subject S) and, as an observed image, an image of fluorescent light in the infrared light band emitted by ICG administered in living body tissues. The imaging device 100A includes a camera unit 101, a controller 102, a monitor 103, and the like.

The camera unit 101 includes, in front of the subject, an LED excitation light source 104 of a near-infrared wavelength as a supplementary light source for generating the excitation of ICG. The camera unit 101 includes therein a CCD 105 having sensitivities to the near-infrared light band and the visible light band, and a lens system 106 for forming an image on the CCD 105. An excitation light cut filter 50 is provided in front of the lens system 106. Inside the lens system 106, there is provided the two-blade type aperture stop 10A, for example, as the aperture stop 10 of the present invention. Note that the aperture stop 10 of the present invention may be any of the variety of embodiments described above, and if the aperture stop with the excitation light cut filter layer 5 formed thereon is provided, the excitation light cut filter 50 is unnecessary.

The controller 102 has image processing functions for adjusting the contrast of an image captured by the CCD 105 and removing the noise from the image. The controller 102 also has a function for outputting image data to the monitor 103 so that a subject image and an observed image are simultaneously outputted to the monitor 103 and a function for outputting image data to an external recorder, a communication device, etc. which are connected as needed.

A method for using the imaging device 100A includes: administering ICG in advance to a predetermined area of a patient to be a subject S; capturing the image of the subject S under illumination light L1 by an external illuminator 110 such as shadowless light; simultaneously capturing the subject image formed by the illumination light L1 and an observed image formed by fluorescent light of ICG; and outputting a synthetic image thereof to the monitor 103 for the diagnosis of the subject S.

Herein, a light source for the illumination light by the external illuminator 110 is preferably a fluorescent lamp, a halogen lamp, a xenon lamp, an LED, or the like, and white light obtained by cutting off light in the infrared light band (especially, white light obtained by cutting off light in the wavelength range of 810 nm or more that forms an observed image) is used as the illumination light by the external illuminator 110.

When capturing an image, the sensitivity and focus of the imaging device 100A are first adjusted based on the intensity of fluorescent light from the observed area. Next, the degree of opening of the aperture area 2 of the aperture stop 10 is suitably adjusted.

Figure 9:
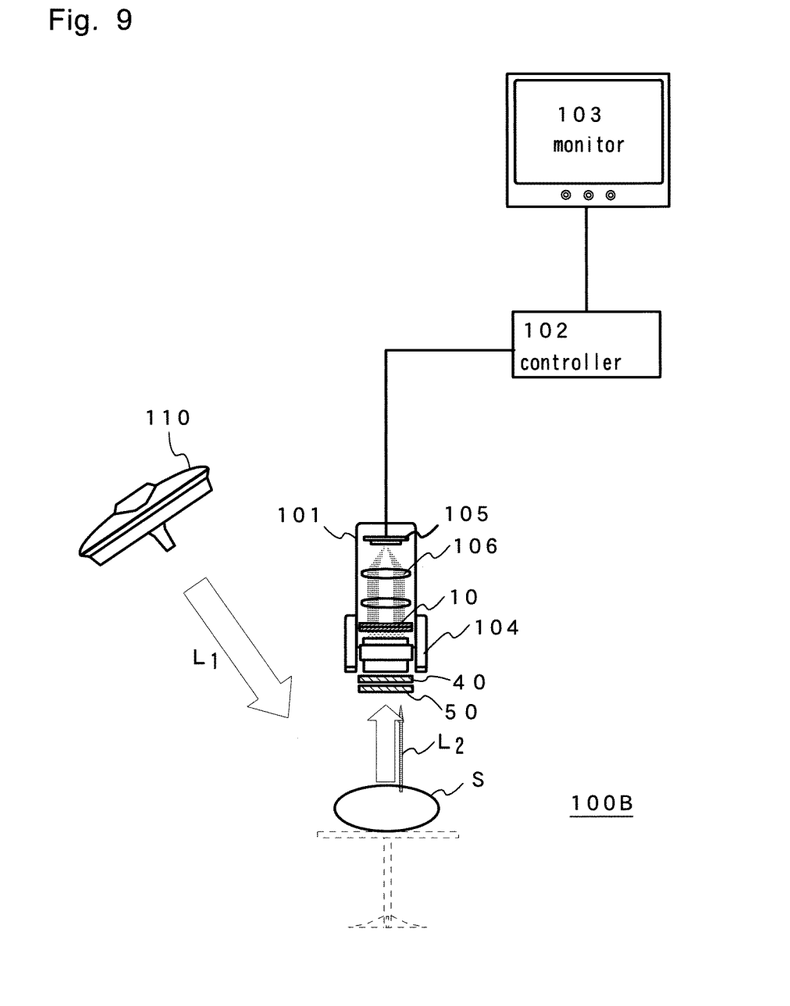
FIG. 9 is a schematic view showing a configuration of an imaging device 100B according to an embodiment of the present invention.

As an imaging device including the aperture stop of the present invention therein, a neutral density (ND) filter 40 may be provided in front of the lens system 106 as shown in an imaging device 100B of FIG. 9. The ND filter 40 can transmit light in the wavelength range corresponding to fluorescent light from the observed area of the subject and reduce or block the transmission of light in the wavelength range corresponding to illumination light of the subject. In the aperture stop 10 of the present invention, a subject image deteriorates in quality when the area of the aperture area 2 is excessively reduced. In this case, visible light forming the subject image may not be reduced sufficiently when the aperture stop 10 of the present invention is solely used. Even in such a case, by using both of the aperture stop 10 of the present invention and the ND filter 40 that transmits light in the wavelength range corresponding to fluorescent light from the observed area of the subject and reduces or blocks the transmission of light in the wavelength range corresponding to illumination light of the subject, it becomes possible to sufficiently reduce light forming the subject image and to clearly capture both of the observed image formed by fluorescent light and the subject image.

Figure 10:
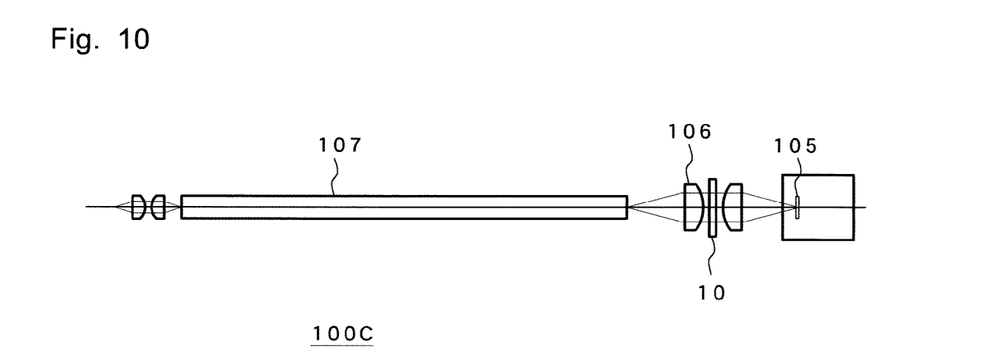
FIG. 10 is a schematic view showing a configuration of an endoscopic imaging device 100C according to an embodiment of the present invention.

The aperture stop of the present invention can be included not only in the hand-held type imaging device but also in a built-in imaging device, and can be included also in an endoscope, a laparoscope, or the like. For example, FIG. 10 is a schematic diagram showing a configuration of a fiber type endoscopic imaging device 100C including the aperture stop 10 of the present invention. In this drawing, reference numeral 107 denotes an optical fiber. If the aperture stop of the present invention is included in an optical system at an end portion of an endoscope to be inserted into a body, it is difficult to wash and sterilize that portion. However, as shown in FIG. 10, by providing the aperture stop 10 of the present invention at a portion that is not inserted into a body, it is possible to easily adjust the brightness of the subject image formed by illumination light and the brightness of the observed image formed by fluorescent light. Note that a known illumination optical system (not shown) may be provided in this imaging device 100C.

Figure 11:
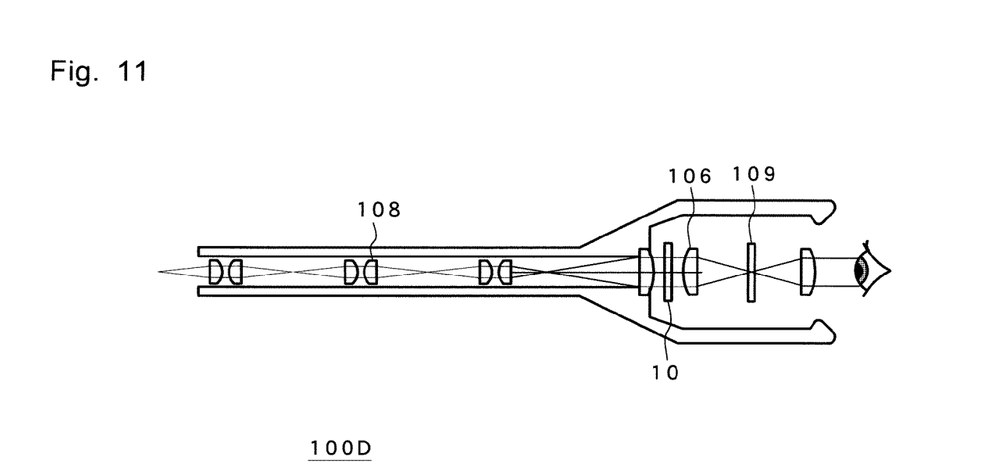
FIG. 11 is a schematic view showing a configuration of an endoscopic observation device 100D according to an embodiment of the present invention.

Moreover, the aperture stop of the present invention can be included in an observation device. In such a case, in order to visualize fluorescent light, a fluorescent light conversion plate is used as needed. For example, FIG. 11 is a schematic diagram showing a configuration of a relay lens type endoscopic observation device 100D including the aperture stop 10 of the present invention. In this figure, reference numeral 108 denotes a relay lens. A known illumination optical system (not shown) can be provided also in this observation device 100D. In the observation device, an ND filter, or an excitation light cut filter can be also provided as needed in the same manner described above.

The present invention encompasses these devices having therein the aperture stop of the present invention.

INDUSTRIAL APPLICABILITY

The aperture stop of the present invention is useful in a fluorescent light image imaging device that utilizes a fluorescent reagent such as ICG, an imaging device used in the medical field such as PDD or PDT, and also for capturing a fluorescent light image in an analytical test of foods or various materials.

DESCRIPTION OF REFERENCE NUMERALS

1 . . . filter area
1a . . . filter layer
2 aperture area
3 . . . flat-plate substrate
3b . . . lens
4 . . . outer frame
5 . . . excitation light cut filter layer
10, 10A, 10B, 10E, 10F . . . two-blade type aperture stop
20A, 20B, 20C, 20D, 20E, 20F . . . stop blade member
21 . . . filter portion
21a . . . filter layer
22 . . . non-filter portion
23 . . . flat-plate substrate
24 . . . outer frame
25 . . . rail
40 . . . ND filter
50 . . . excitation light cut filter
100A, 100B . . . imaging device
100C . . . fiber type endoscopic imaging device
100D . . . relay lens type endoscopic observation device
101 . . . camera unit
102 . . . controller
103 . . . monitor
104 . . . LED excitation light source
105 . . . CCD
106 . . . lens system
110 . . . external illuminator

The invention claimed is:

1. An aperture stop, comprising a plurality of stop blade members each having a filter portion formed on a part of or an entire surface of the stop blade member, thereby defining a filter area formed by the filter portions of the plurality of stop blade members, and an aperture area positioned inside the filter area, wherein:
the filter area transmits light in a wavelength range corresponding to fluorescent light from an observed area of a subject, and reduces or blocks transmission of light in a wavelength range corresponding to illumination light to the subject;
the aperture area transmits the light in the wavelength range corresponding to the fluorescent light from the observed area of the subject, and the light in the wavelength range corresponding to the illumination light to the subject;
the light in the wavelength range corresponding to the fluorescent light from the observed area of the subject is not reduced, and an area of the aperture area is variable; and
wherein a total thickness of the stop blade member in an optical axis direction in the filter area is the same as a total thickness of the stop blade member in an optical axis direction in the aperture area.

2. The aperture stop according to claim 1, wherein the fluorescent light from the observed area of the subject is infrared light and the illumination light is visible light.

3. An observation device, comprising the aperture stop according to claim 1, for simultaneously observing both an observed image formed by the fluorescent light from the observed area of the subject and a subject image formed by the illumination light.

4. The observation device according to claim 3, comprising a neutral density filter that transmits light in a wavelength range corresponding to the fluorescent light from the observed area of the subject and reduces or blocks the transmission of light in a wavelength range corresponding to the illumination light of the subject.

5. An imaging device, comprising an aperture stop for capturing both an observed image formed by fluorescent light from an observed area of a subject by irradiation of excitation light and a subject image formed by an illumination light, wherein:
the aperture stop comprises a plurality of stop blade members each having a filter portion formed on a part of or an entire surface of the stop blade member, thereby defining a filter area formed by the filter portions of the plurality of stop blade members, and an aperture area positioned inside the filter area,
the filter area transmits light in a wavelength range corresponding to fluorescent light from an observed area of a subject, and reduces or blocks transmission of light in a wavelength range corresponding to illumination light to the subject;
the aperture area transmits the light in the wavelength range corresponding to the fluorescent light from the observed area of the subject, and the light in the wavelength range corresponding to the illumination light to the subject; and in a maximum area of an optical path at an attachment position of the aperture stop in the imaging device, the light in the wavelength range corresponding to the fluorescent light from the observed area of the subject is not reduced, and an area of the aperture area is variable.

6. The imaging device according to claim 5, comprising a neutral density filter that transmits light in a wavelength range corresponding to the fluorescent light from the observed area of the subject and reduces or blocks the transmission of light in a wavelength range corresponding to the illumination light of the subject.

* * * * *